Sept. 6, 1966  W. G. PFANN  3,270,554

DIFFUSED LAYER TRANSDUCERS

Filed Jan. 4, 1961  2 Sheets-Sheet 1

INVENTOR
W. G. PFANN
BY
*George S. Bedy*
ATTORNEY

Sept. 6, 1966  W. G. PFANN  3,270,554
DIFFUSED LAYER TRANSDUCERS
Filed Jan. 4, 1961  2 Sheets-Sheet 2

INVENTOR
W. G. PFANN
BY
ATTORNEY

United States Patent Office 3,270,554
Patented Sept. 6, 1966

3,270,554
DIFFUSED LAYER TRANSDUCERS
William G. Pfann, Far Hills, N.J., assignor to Bell Telephone Laboratories, Incorporated, New York, N.Y., a corporation of New York
Filed Jan. 4, 1961, Ser. No. 80,672
1 Claim. (Cl. 73—88.5)

This invention relates to piezoresistive strain gages. Further, it represents a new technique in gage manufacture resulting in an improved gage construction affording significant advantages over known gage constructions.

The strain gage of this invention is a composite semiconductor member having a base layer and a thin layer of prescribed configuration having a relatively low resistance formed into the base layer by diffusion.

The base layer is essentially a carrier for the diffused layer which, when constructed according to the teachings of this invention, becomes the active piezoresistive arm of the gage. Electrical contacts are disposed at appropriate points of the diffused layer to measure the piezoresistive change induced by the strain to be measured. The base layer is preferably thin so that when attached to a member in which strains are to be measured, these strains are effectively transferred to the thin diffused layer. The diffused layer is formed in the desired position or configuration in base layer by conventional masking techniques and is preferably less than one-quarter the thickness of the base layer. To render the base layer essentially electrically insulating so that the predominant variation in current is the piezoresistive effect measured across the diffused layer, the diffused layer should preferably have a conductivity at least ten times that of the base layer.

Typical semiconductors used for strain gages are extremely brittle at or near room temperature. Even if carefully prepared, machined and handled, they nevertheless can be strained elastically only about 1 or 2 percent before fracture occurs. This preparation and treatment requires removal of stress-raising micro-cracks inevitably introduced through mechanical shaping by extensive etching of the semiconductor. Such etching procedures are incompatible with the close control of dimensions required in the manufacture of practical semiconductor strain gages. However, in the composite piezoresistive strain gage of this invention, the dimensions of the base layer are not critical since the active piezoresistive arm is composed only of the layer diffused into the base. Accordingly, in this case, extensive etching of the base layer is tolerable. The active diffused area can then be produced in the surface of the semiconductor crystal without introducing deleterious strain-raising micro-cracks. Further, the diffusion technique is superior to the conventional mechanical machining since it can be done more cheaply and accurately. These considerations are especially significant in making complex gage configurations such as those described in copending application, W. G. Pfann, Serial No. 82,022 filed December 2, 1960, some of which are hereinafter described.

Another advantage of the composite structure of this invention lies in the greater reproducibility of strain and the reliable sensitivity to transverse strains as compared with conventional semiconductor gages in the shape of rods. In conventional gage constructions end effects, and especially the uncertain sensitivity to strains transverse to the rod axis provide poor reproducibility and sensitivity.

The composite structure, wherein the active diffused region is purposely spaced some distance from the edges of a relatively large flat surface, is essentially free of end effects and exhibits full transverse sensitivity.

It has recently been found that piezoresistive compositions of high electrical conductivity, $\sim 10^3$ ohm$^{-1}$ cm.$^{-1}$, are rather insensitive to temperature changes, and hence favored. Fabrication of these compositions into devices having impedances $\sim 100$ ohms, which is required for use with available instruments, requires that they be very small in cross-section. The difffusion gages of this invention can be much more easily fabricated in such dimensions than can conventional gages which require mechanical or chemical shaping techniques.

Various other advantages as well as the basic character of the invention will become more apparent from an examination of the drawings in which.

Figure 1:
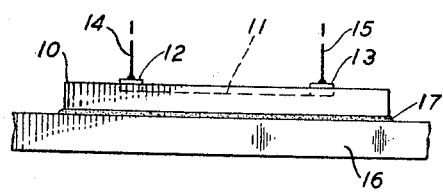
FIG. 1 is a front elevation of the diffused gage structure according to its simplest aspects.

FIG. 1 shows a simple diffused gage construction consisting basically of base layer 10 and diffused layer 11. The thickness of the diffused layer in this figure and those following is exaggerated for clarity. Contacts 12 and 13 and leads 14 and 15 are provided at opposite ends of the diffused layer to measure the piezoresistive variations through this layer. These contacts are conventional alloy contacts as are well known in the art. The base layer 10 is affixed to the member 16 in which strains are to be measured by glue 17 or other appropriate means.

A preferred embodiment for the diffusion layer of FIG. 1 is to have the layer of p-type silicon, the body of n-type silicon, and the direction of the layer (direction of current flow) [111]. An advantage of this embodiment is that [111] is a sensitive piezoresistance direction for p-type silicon (the layer material) but is insensitive for n-type silicon, the body material. Therefore, any bias current that leaks into the body from the (+) terminal of the layer, and flows generally in the [111] direction in the body to the (−) terminal of the layer does not adversely affect the resistance change in the layer itself under strain.

An alternate embodiment using this principle is to have a layer of n-silicon, current in the [100] direction, and the body of p-silicon.

On the other hand, for a material like germanium, for which n- and p-type materials have large and opposite-insign values of $\pi_{44}$, the piezoresistive changes in the leakage current in the body would tend to cancel those in the layer. Here the effect of leakage current is more harmful. Accordingly, the critical resistance ratio of 10 for the body to 1 for the diffused layer should be adhered to in these cases.

Figure 2:
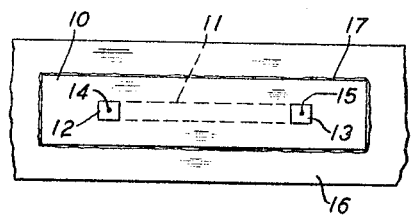
FIG. 2 is a plan view of FIG. 1.

FIG. 2 shows the plan view of FIG. 1 and reference numerals refer to the same elements as in FIG. 1.

Figure 3:
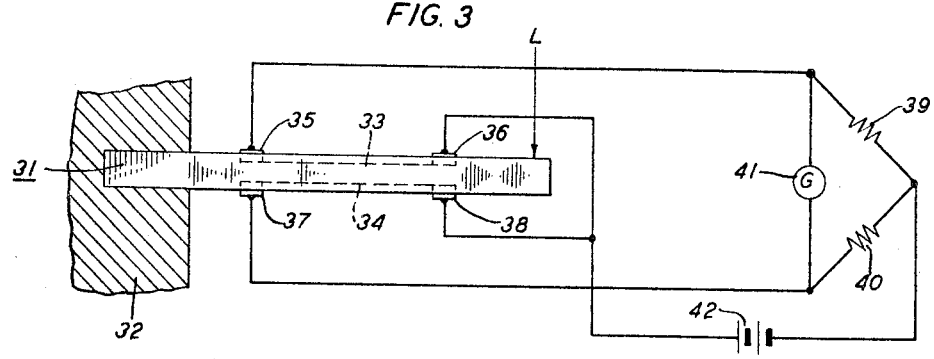
FIG. 3 is a front elevation partly in section of a modified gage construction together with a schematic representation of related circuitry.

FIG. 3 shows a modified gage construction utilizing two active piezoresistive arms connected in contiguous arms of a Wheatstone bridge. This gage is adapted to measure bending or flexing strains appearing in the gage. The base layer 31 is affixed to a static member 32 and subjected to load L. The load produces a tensile strain on the upper surface of the base layer which is measured by diffused piezoresistive layer 33. The compressive strain appearing along the lower face of base layer 31 is detected by diffused piezoresistive layer 34. Contacts 35, 36, 37 and 38 are provided and connected into the bridge circuit as shown. Standard resistors 39, 40, galvanometer 41 and current source 42 are included. As will be hereinafter more fully set forth, the piezoresistive response for the diffused layers 33 and 34 are opposite in sign when the semiconductor is properly chosen according to the crystallographic orientation of the base layer. Accordingly, these opposite current variations are added by the bridge circuit when connected as shown and the overall response of the gage is twice that obtained with one active piezoresistive arm. Furthermore, the opposite current variations produced in this gage construction allow for inherent compensation of the gage against ambient factors which tend to unbalance or interfere with ordinary gage readings such as thermal changes, changes in hydrostatic pressures and strains generated by differential thermal expansion between the base layer and the support or loading members.

Figure 4:
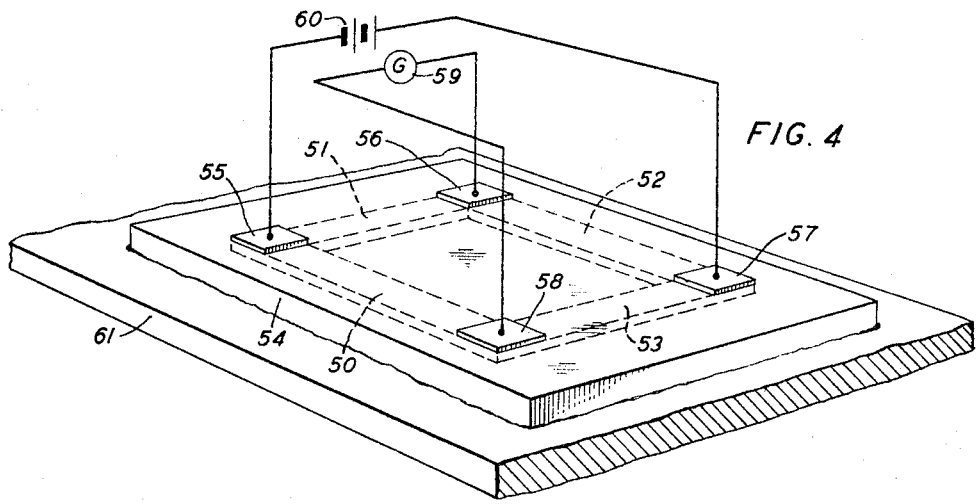
FIG. 4 is a perspective view of a preferred diffused construction requiring a more complex gage geometry and to which this invention is aptly suited.

FIG. 4 shows a preferred form of this invention which is a full bridge piezoresistive strain gage. In this modification four active arms 50, 51, 52 and 53 are provided in the form of diffused layers formed in the base layer 54. Alloy contacts 55, 56, 57 and 58 are provided at each corner and connected with the leads as four arms of a Wheatstone bridge, including galvanometer 59 and current source 60. The base layer 54 is glued or otherwise affixed to the member 61 in which strains are to be measured. With the proper choice of crystallographic orientations of the diffused layer into the semiconductor crystal base layer 54 opposing arms of the bridge will register a piezoresistive effect due to a undirectional strain dictated by a transverse piezoresistive constant for one set and a longitudinal coefficient for the other set. Judicious choice of these coefficients will provide resistance changes in adjacent arms to be opposite in sign. This allows the use of a full bridge and provides a number of inherent advantages such as compensation against resistance variations induced by thermal changes, and unbalances ordinarily appearing due to variations in hydrostatic pressure and differential thermal expansion between the gage material and the member to which the gage is affixed. Typical orientations which provide opposite piezoresistive coefficients in adjacent arms for a undirectional strain are: plane of base member (001), directions of arms [010] and [100] for n-type silicon in the diffused layers; or plane of base member (001), directions of arms: [110] and [1$\bar{1}$0] for n-type germanium, or p-type germanium or silicon in the diffused layers. This gage configuration is fully detailed in my copending application, W. G. Pfann, Serial No. 82,022, filed December 2, 1960.

In each of these embodiments various crystallographic orientations may be chosen for the diffused active arm depending upon the material of the base and the application for which the gage is intended. The following table contains several useful orientations of various semiconductor materials.

*Table I*

| Example | Material | Plane of Gage | Direction of Arm |
| --- | --- | --- | --- |
| 1 | n-silicon | 001 | 100 or 010 |
| 2 | n-silicon | 110 | 001 or 1$\bar{1}$0 |
| 3 | n or p-germanium | 100 | 110 or 1$\bar{1}$0 |
| 4 | n or p-germanium | 111 | 1$\bar{1}$0 or 11$\bar{2}$ |
| 5 | n or p-germanium | 11$\bar{2}$ | 111 or 1$\bar{1}$0 |
| 6 | n or p-germanium | 1$\bar{1}$0 | 111 or 11$\bar{2}$ |
| 7 | p-silicon | 111 | 1$\bar{1}$0 or 11$\bar{2}$ |
| 8 | p-silicon | 1$\bar{1}$0 | 111 or 11$\bar{2}$ |
| 9 | p-silicon | 100 | 110 or 1$\bar{1}$0 |
| 10 | p-silicon | 11$\bar{2}$ | 111 or 1$\bar{1}$0 |
| 11 | n-GaSb | 100 | 110 or 1$\bar{1}$0 |
| 12 | n-GaSb | 11$\bar{2}$ | 111 or 1$\bar{1}$0 |
| 13 | n-InSb | 001 | 100 or 010 |
| 14 | p-PbTe | 11$\bar{2}$ | 111 or 1$\bar{1}$0 |
| 15 | p-PbTe | 100 | 110 or 1$\bar{1}$0 |

Any of these orientations are appropriate for the active arms of FIGS. 1–4. The gage of FIG. 4 utilizes the same semiconductor material for all four arms. In this case two opposite arms are in the first direction given and the remaining pair assume the alternative direction given. In each of these examples the piezoresistive coefficients of the alternative pairs of directions are opposite in sign.

In each of the devices of FIGS. 1–4 care must be taken to insure that the piezoresistive effect measured is primarily in the diffused layers and not to be confused with variations in the base layer which may in fact exhibit a piezoresistive effect opposite to that of the layer such that the response cancel. As previously set forth, if the relative resistances of the base layer and diffused layers conform to the ratio given, 10:1, then such irregularities will be minimized. However, it may in some cases be impractical if not impossible to achieve this limit. A preferred remedy in these cases is to back bias the junction such that the available path of effective current flow between the two contacts on the diffused layer measuring the piezoresistive change is through the diffused layer as desired.

A further preferred embodiment of this invention utilizes a particular character of diffused layers for measuring or detecting stress. These devices are based upon the ability of p-n junctions to exhibit variations in junction current responsive to strain. Thus, according to this embodiment the layer diffused into the base member forms a p-n junction at the interface. Tension or compression applied to the junction results in variations in junction current which are detected by appropriate sensing means.

Figure 5:
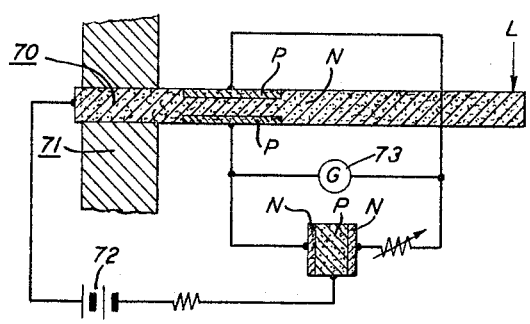
FIG. 5 is a front elevation in section of a p-n junction strain gage including an appropriate circuit in schematic diagram.

A particular stress transducer operating according to a more complex application of this principle is shown in FIG. 5. The base member 70 is suspended in support 71. This base member, here shown as n-type may be either p- or n-type semiconductor as desired. Diffused into the upper and lower faces of member 70 are layers of opposite conductivity type (here p-type) thus forming p-n junctions adjacent the upper and lower faces. The junctions are connected as adjacent arms of a Wheatstone bridge including biasing source 72 and galvanometer 73, as shown, such that the bridge records the difference between the voltage changes in each active arm. The other arms of the bridge are passive and are constituted either by p-n junctions having essentially the characteristics of those of the active bridge arms diffused into bar 70, or by ordinary resistors. This use of similar p-n junctions in each arm renders the over-all bridge insensitive to deviations and unbalances ordinarily produced by influences such as thermal effects on resistance, Joule heating effects, hydrostatic pressure vairations—i.e., any ambient influence which affects each arm in the same manner and degree.

Referring again to FIG. 5, as the gage is subjected to load L the bar 70 is placed under compression along its lower face and tension along its upper face. Since the resistance response of the junction in compression is opposite of that in tension the voltage variations exhibited by the two active arms of the gage was opposite and the overall difference recorded by galvanometer 73. Thus the combined response of two diffused p-n junctions to strains exerted in a medium are advantageously employed as a sensitive and reliable stress or strain transducer. Device designs of this character can be applied to various uses. For instance a diffused p-n stress gage can be utilized as a sound detector or microphone by simply having the load produced by sound waves effectively translated to the diffused junction. To this end the diffused junction or combination of junctions may be formed directly in a thin diaphragm member adapted for sound pickup.

Figure 6:
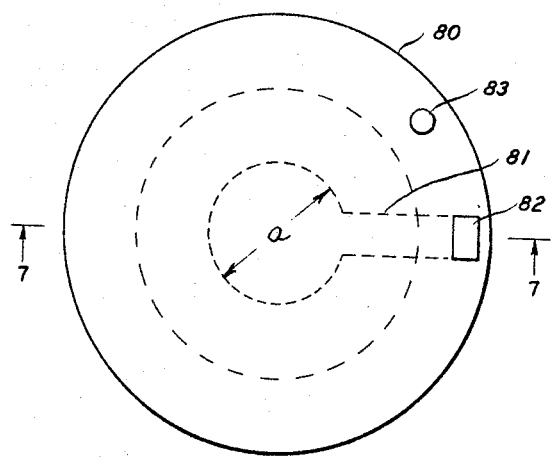
FIG. 6 is a plan view of a preferred embodiment of this invention utilizing a junction transducer.
Figure 7:
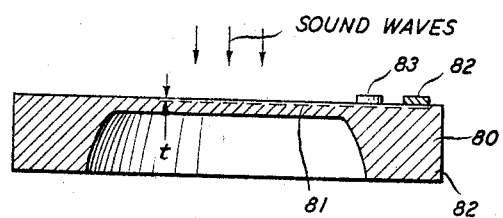
FIG. 7 is a front view of the device of FIG. 6.

A typical microphone having this desired construction is shown in FIG. 6. The diaphragm 80, composed of a semiconductor material having a given conductivity type, here p-type, has a layer 81 of the opposite conductivity type, here n-type, diffused into its central area. Electrodes 82 and 83 are conveniently fixed to each conductivity region. The preferred geometry of this embodiment can be appreciated from FIG. 7 which is an elevational view of FIG. 6. The reference numerals denote the same elements as those in FIG. 6. The sound waves, capable of displacing the thin region of the diffused layer 81, are incident on the device as shown. To facilitate proper sensitivity the ratio of $a$, the radius of the diffused layed in FIG. 6, to $t$, the thickness of the diffused region (FIG. 7) should be greater than 50 and more desirably greater than 200.

The manner of obtaining the diffused layer is not material to the effective operation of these devices. Accordingly, all the diffused layers described herein may be prepared by any of the many well known procedures, for instance by mesa etch or mask diffusion technique. The depth of the diffused layer is preferably less than two mils. One specific procedure for preparing the particular device fabricated of n-silicon with a diffused layer of p-silicon as described hereinbefore is as follows:

A slice of n-type silicon approximately 0.002 in. thick and ¼ x ¼ in area is prepared and its upper surface coated with a suspension of boric oxide in methyl cellosolve, or water. After drying, the body is heated in air to about 1200° C. for about 16 hours, producing a p-type layer of the order of 0.001 inch thick in the coated surface. The body is then masked with wax in a strip configuration 0.20 inch wide and 0.25 inch long. The unmasked portion of the p-type layer is then etched off with an etching solution consisting of 19 parts 70% $HNO_3$ plus 5 parts 48% HF by volume. Gold contacts are then evaporated on the ends of the strip through a mask. The body is heated until the contacts fuse to the silicon. Wire connections are soldered to the gold alloy contacts. The finished device can then be bonded to the test member using a suitable adhesive such as Allen PBX cement.

In some instances it is convenient to diffuse a piezoresistive layer directly into the member being tested. In this instance the test member should have essentially the same characteristics as those described for the base layer. Where a base layer is used layer thicknesses of less than one millimeter are appropriate. Greater thicknesses introduce difficulties in effectively transferring the strain from the strained member to the base layer.

What is claimed is:

A piezoresistive strain gage comprising a semiconductor base layer having a piezoresistive diffused layer formed integrally therewith, said diffused layer having a geometry in the plane of the gage of four elongated strips joined end to end to form a parallelepiped and four electrical contacts attached to said diffused layer at the approximate intersection of the strips, said contacts connected in a Wheatstone bridge circuit such that the piezoresistive effects in opposite arms will add.

References Cited by the Examiner
UNITED STATES PATENTS

| 2,632,062 | 3/1953 | Montgomery. |
| 2,898,477 | 8/1959 | Hoesterey _____ 179—110.2 |
| 2,929,885 | 3/1960 | Mueller. |
| 2,939,317 | 6/1960 | Mason _____ 73—88.5 X |
| 3,049,685 | 8/1962 | Wright _____ 338—2 |

OTHER REFERENCES

Herring, C.: "Transport Properties of a Many-Valley Semiconductor," Bell System Technical Journal, volume 34, No. 2, March 1955, pages 237–290 (pages 255–257 relied on).

Smith, C. S.: "Piezoresistance Effect in Germanium and Silicon," Physical Review, volume 94, No. 1, April 1, 1954, pages 42 to 49.

RICHARD C. QUEISSER, *Primary Examiner.*

CHARLES A. CUTTING, JOSEPH P. STRIZAK,
*Examiners.*

H. C. PRITCHETT, E. F. KARLSEN,
*Assistant Examiners.*